(12) United States Patent
Komatsu (10) Patent No.: US 8,699,793 B2
(45) Date of Patent: Apr. 15, 2014

(54) IMAGE PROCESSING APPARATUS, IMAGE PROCESSING METHOD, AND PROGRAM

(75) Inventor: Satoru Komatsu, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/492,218

(22) Filed: Jun. 8, 2012

(65) Prior Publication Data

US 2012/0314947 A1 Dec. 13, 2012

(30) Foreign Application Priority Data

Jun. 10, 2011 (JP) .................................. 2011-129820

(51) Int. Cl.
*G06K 9/00* (2006.01)

(52) U.S. Cl.
USPC .......................................... 382/167; 382/162

(58) Field of Classification Search
USPC .......... 382/162, 167, 258, 300, 321; 358/505, 358/518; 345/426, 427; 359/715, 771; 348/241, 602, 231.99, 234, 222.1
See application file for complete search history.

(56) References Cited

U.S. PATENT DOCUMENTS

| | | | | |
|---|---|---|---|---|
| 3,609,012 | A * | 9/1971 | Street ............................ | 359/715 |
| 7,508,975 | B2 * | 3/2009 | Izumi et al. ................... | 382/149 |
| 8,098,294 | B2 * | 1/2012 | Nashizawa ................ | 348/222.1 |
| 8,164,594 | B2 * | 4/2012 | Watanabe et al. ............. | 345/426 |

FOREIGN PATENT DOCUMENTS

| | | | | |
|---|---|---|---|---|
| JP | 403021190 A | * | 1/1991 | ............... H04N 9/29 |
| JP | 2006-014261 A | | 1/2006 | |
| JP | 2008-147980 A | | 6/2008 | |

* cited by examiner

*Primary Examiner* — Anh Do
(74) *Attorney, Agent, or Firm* — Rossi, Kimms & McDowell LLP (57) ABSTRACT

An image processing apparatus is configured to perform processing for reducing color fringing in a color image. The image processing apparatus includes an estimator configured to estimate, for each area, a correction amount used to reduce the color fringing, a smoother configured to smooth a plurality of correction amounts for a plurality of areas estimated by the estimator, and a reducer configured to reduce the color fringing utilizing the correction amounts smoothed by the smoother.

5 Claims, 7 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program used to reduce color fringing in a color image.

2. Description of the Related Art

A color image pickup system causes a color that cannot be by nature or color fringing around a bright region in an image due to the chromatic aberration of the imaging optical system. Japanese Patent Laid-Open No. ("JP") 2008-147980 proposes an image processing method for estimating a correction amount of color fringing and for reducing the color fringing by subtracting the correction amount for each color component from an input color image. In addition, JP 2006-014261 reduces color fringing by determining a purple area around white skip pixels as a color fringing area, and by replacing the color fringing pixel with a neighboring pixel of the color fringing region.

However, correction amounts may scatter among neighboring pixels in the image processing method of JP 2008-147980. In particular, when an estimator is configured to estimate a correction amount of color fringing by an image intensity slope between neighboring pixels for each color component, the correction amounts are likely to scatter. By subtracting a scattering correction amount among pixels from the input color image, the color fringing reduced image may contain noises that cannot be contained in the input color image.

On the other hand, the image processing method of JP 2006-014261 replaces the color fringing region with surrounding pixels, and performs shading-off processing configured to reduce scatters caused by the replacements but the color fringing region and the surrounding region are likely to lose sharpness.

Thus, the conventional color fringing reducing processing causes an input colored image to contain noises that cannot exist in the input color image or the color fringing reduced image is likely to lose sharpness.

SUMMARY OF THE INVENTION

This invention provides an image processing apparatus, an image processing method, and a program, which can maintain sharpness of an image in which color fringing has been reduced.

An image processing apparatus according to one aspect of the present invention is configured to perform processing for reducing color fringing in a color image. The image processing apparatus includes an estimator configured to estimate, for each area, a correction amount used to reduce the color fringing, a smoother configured to smooth a plurality of correction amounts for a plurality of areas estimated by the estimator, and a reducer configured to reduce the color fringing utilizing the correction amounts smoothed by the smoother.

Further features of the present invention will become apparent from the following description of exemplary embodiments with reference to the attached drawings.

DESCRIPTION OF THE EMBODIMENTS

Referring now to accompanying drawings, a description will be given of embodiments of the present invention.

First Embodiment

Figure 1:
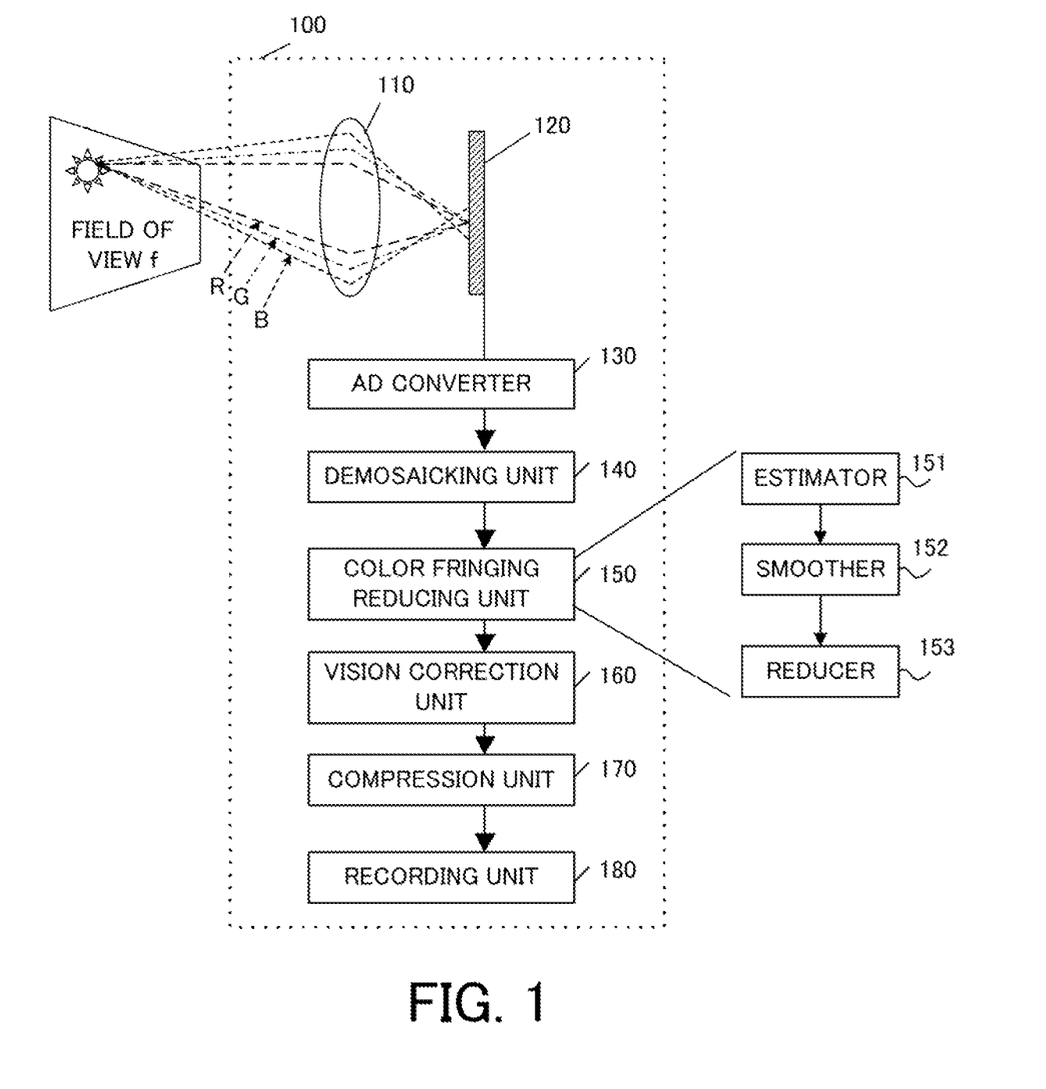
FIG. 1 is a block diagram an image pickup apparatus according to a first embodiment of the present invention.

FIG. 1 is a block diagram of an image pickup apparatus 100 including an image processing apparatus configured to reduce color fringing in a color image according to a first embodiment. The image pickup apparatus 100 includes an imaging optical system 110, an image sensor (image pickup element) 120, an AD converter 130, a demosaicking unit 140, a color fringing reducing unit 150, a vision correction unit 160, a compression unit 170, and a recording unit 180.

In FIG. 1, an image of a field of view (object) f is formed on the image sensor 120 through the imaging optical system 110. A chromatic aberration of the imaging optical system 110 of this embodiment is corrected in all wavelength regions to some extent: In particular, the chromatic aberration of the G wavelength band is well corrected, and more chromatic aberrations in other wavelength bands remain than that of the G wavelength band. If the correcting level of the chromatic aberration is reduced, another aberrational correction, a miniaturization, and a cost reduction can be well promoted.

The image sensor 120 performs a photoelectric conversion for an object image, and is a single-plate color image sensor including a general primary color filter system. The primary color filter system includes three types of color filters having transmitted dominant wavelength ranges near 650 nm, 550 nm, and 450 nm, as illustrated in FIG. 4 of 2008-147980, and photographs color components of each of RGB bands. In the single-plate color image sensor, this color filter is spatially arranged for each pixel, and can obtain only the intensity of a single color component for each pixel. Thus, the image sensor outputs a color mosaic image. Alternatively, the light is separated into the RGB wavelength ranges using a color separating prism, and a three-plate type color image sensor may be used so as to use different image sensors for them. In this case, the demosaicking unit 140 is unnecessary.

The AD converter 130 converts a color mosaic image output from the image sensor as an analogue voltage into digital data suitable for image processing.

The demosaicking unit 140 interpolates the color mosaic image and generates a color image having uniform RGB color information for all pixels. The interpolating method is not limited. Due to the chromatic aberration of the imaging optical system 110, the generated color image becomes an image in which resolutions of the RB components are inferior to the resolution of the G component. As a result, red and blue blur in the boundary between the bright region and the dark region, as illustrated in FIG. 6 of JP 2008-147980, and artifacts occur like red, blue, and purple edgings in which red and blue are mixed around the bright region. Herein, the fringing degrees of RB components are different due to the characteristic of the imaging optical system, the spectral distribution of the light source in the image, etc. Even when the image sensor 120 is a complementary color filter, the color image can be similarly obtained from the RGB color components through the color conversion processing.

As described later, the color fringing reducing unit 150 constitutes an image processing apparatus configured to perform a spatial operation, to extract a color fringing area, to estimate a color fringing amount, and to reduce the estimated amount in the input color image through a subtraction.

Next, the vision correction unit 160 performs various processing used to mainly improve an appearance of the color image, such as a tone curve (gamma) correction, a chroma emphasis, a hue correction, and an edge emphasis.

Next, the compression unit 170 compresses a corrected color image using a method of JPEG, etc. so as to reduce the size of a color image.

Actually, those components from the image sensor 120 to the recording unit 180 may not be separate devices, and a single microprocessor (microcomputer) may perform processing that serves as a plurality of components. The digital image signal that has experienced the compression processing is recorded by the recording unit 180 that may be a recording medium, such as a flush recording unit.

A description will now be given of image processing performed by color fringing reducing unit 150. The color fringing reducing unit 150 includes an estimator 151, a smoother 152, and a reducer 153, processes an input image in this order, and outputs an output image. The color fringing reducing unit 150 sets the RB components to an object to be reduced, and uses the G component as a reference component.

Figure 2A:
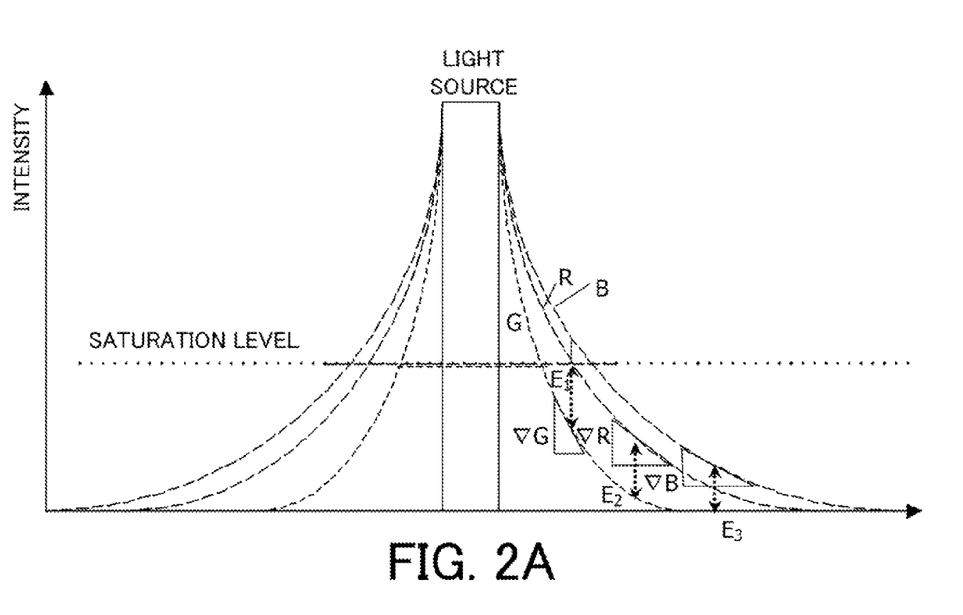
FIG. 2A is a view of typical profiles of an R plane, a B plane, and a G plane for a highly bright object according to the first embodiment.

A description will now be given of the presence or absence of color fringing by the estimator 151 and an illustrative estimating method of a correction amount. FIG. 2A is typical profiles of the RGB components for a highly bright object. An abscissa axis denotes a section in the image, and an ordinate axis denotes intensities of the RGB components.

As described in JP 2008-147980, the RGB components saturate with shapes slightly larger than the original, highly bright object as a captured image, and a white saturated area is formed. The R and B components have approximately the same profiles. The G component gradually attenuates, but the saturation radii of the RB components are wider and the image intensity difference between the G component and the RB components increases and magenta tints become conspicuous. However, when the RB components reach the saturation radii, the RB components start attenuating. Then, the image intensity difference between the G component and the RB components reduces, and purple fringing appears. The G component reaches the end of the skirt at a certain point, and then only the RB components have intensities and the chroma of the purple fringing becomes higher.

The magenta fringing and purple fringing cause unnatural colors around the brightness saturated region. If the fringing of the R component and the fringing of the B component are similar to the fringing of the G component, no magenta fringing or purple fringing occur and the color of the highly bright object is recognized as natural fringing.

Accordingly, the estimator 151 estimates a color fringing amount utilizing a slope (gradient) of the signal intensity for each color component between neighboring pixels, and a correction amount used to reduce the color fringing amount for each pixel (region). This slope of the signal intensity for each color component between neighboring pixels may be regarded as a difference (variation amount) of a signal intensity between neighboring pixels. More specifically, the estimator 151 calculates a map indicative of the slope distribution of the signal intensity for each color component, and estimates a color fringing area by the slope amount of the obtained signal intensity. In this case, the estimator 151 performs a slope calculating step of the signal intensity, a color fringing determining step, and a color fringing amount estimating step.

In the slope calculating step of the signal intensity, the estimator 151 calculates the slopes of the signal intensities for the RGB color components utilizing the following expressions:

$$\nabla R = \left(\frac{dR}{dx}, \frac{dR}{dy}\right) \equiv \left(\frac{R(x+1, y) - R(x-1, y)}{2}, \frac{R(x, y+1) - R(x, y-1)}{2}\right) \quad (1)$$

$$\nabla G = \left(\frac{dG}{dx}, \frac{dG}{dy}\right) \equiv \left(\frac{G(x+1, y) - G(x-1, y)}{2}, \frac{G(x, y+1) - G(x, y-1)}{2}\right) \quad (2)$$

$$\nabla B = \left(\frac{dB}{dx}, \frac{dB}{dy}\right) \equiv \left(\frac{B(x+1, y) - B(x-1, y)}{2}, \frac{B(x, y+1) - B(x, y-1)}{2}\right) \quad (3)$$

Herein, R(x+1, y), G(x+1, y), and B(x+1, y) are values of neighboring pixels on the right side of the target pixel for the RGB components. R(x−1, y), G(x−1, y), and B(x−1, y) are values of neighboring pixels on the left side of the target pixel for the RGB components. R(x, y+1), G(x, y+1), and B(x, y+1) are values of neighboring pixels above the target pixel for the RGB components. R(x, y−1), G(x, y−3), and B(x, y−1) are values of neighboring pixels under the target pixels for the RGB components. The calculating range may be enlarged, or a diagonally located pixel may be used.

In the color fringing determining step, the estimator 151 finds the color fringing region based on the slope of the signal intensity, or when the slope amount is equal to or higher than a predetermined value. In this case, not only the slopes of the RB signal intensities but also the slope of the G signal intensity as a reference component are calculated and compared so as to more precisely specify the color fringing region. For example, when the slopes of the RB signal intensities are steeper than the slope of the G signal intensity, it is determined that the color fringing is highly likely. The color fringing region can be effectively specified by changing a threshold of the slope of the signal intensity or a threshold of the slope ratio of the signal intensity.

Finally, in the color fringing amount estimating step, the estimator 151 calculates color estimated amounts $E_R$, $E_G$, and $E_B$ by multiplying the absolute values of $\Delta R$, $\Delta G$, and $\Delta B$ by parameters $k_R$, $k_G$, and $k_B$ as follows:

$$E_R = k_R |\nabla R| \quad (4)$$

$$E_G = k_G |\nabla G| \quad (5)$$

$$E_B = k_B |\nabla B| \quad (6)$$

Herein, $E_G$ is used as an estimated amount for regions in which the RG components are saturated. For example, the nonlinear conversion is performed for the intensity of the R component and the saturation degree $S_R$ is generated. This nonlinear conversion indicates whether or not the R component is saturated, and it is 1 for a region in which the R component is saturated, and 0 for a region in which the R component is not saturated.

Figure 2B:
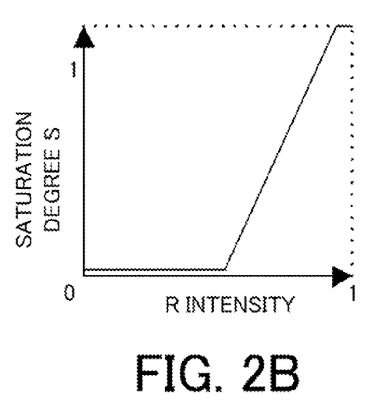
FIG. 2B is a view of a nonlinear converting characteristic according to the first embodiment.

Thus, $S_R$ may be binary such as 0 and 1, but may be a continuously changing value between 0 to 1, as illustrated in FIG. 2B. Then, $E_R$ or $E_G$ calculated by the saturation degree $S_R$ is selected. In other words, when $S_R$ may be binary such as 0 and 1, newly estimated amount $E_R'$ is found as follows:

$$E_R' = \begin{cases} E_R & (S=0) \\ E_G & (S=1) \end{cases} \quad (7)$$

When $S_R$ is a continuously changing value between 0 to 1, a newly estimated amount $E_R'$ is found as follows and used as a correction amount to remove or reduce the color fringing:

$$E_R' = (1-S_B)E_B + S_B E_G \quad (8)$$

Similarly, $E_B'$ becomes as in expression 9 or 10:

$$E_B' = \begin{cases} E_B & (S=0) \\ E_G & (S=1) \end{cases} \quad (9)$$

$$E_B' = (1-S_B)E_B + S_B E_G \quad (10)$$

The smoother 152 performs smoothing processing for a region including a plurality of pixels for each color component utilizing the correction amounts $E_R'$ and $E_B'$ calculated by the estimator 151. Herein, "smoothing" generally means removing a noise component and maintaining the reasonableness by averaging or eliminating data that significantly deviates from other data in continuous data processing.

Herein, this embodiment "removes" the isolated points (in the following isolated point removing step 152b), but when the number of pixels is equal to or smaller than the predetermined number, these pixels have correction amounts, and the surrounding pixels do not have correction amounts, the predetermined number of pixels may be eliminated. In addition, as long as the noises can be removed or reduced, the following noise filter or another means may be used.

In addition, "averaging" of this embodiment means a weighted average (as in the following averaging step 152c), but the type of averaging is not limited and may be a simple average.

The correction amounts $E_R'$ and $E_B'$ have values for a color fringing pixel identified by utilizing the thresholds of the slope of the signal intensity and the slope ratio of the signal intensity. It is effective to use the slope of the signal intensity and the slope ratio of the signal intensity to identify the color fringing pixel, but some pixels may be erroneously identified due to the influence of the noise.

For example, only one pixel has a correction value in the non-color fringing region or only one pixel is determined as non-color fringing in the color fringing region. Similarly, since the correction amounts $E_R'$ and $E_B'$ depend upon the slope of the signal intensity as described above, the correction amount may be significantly different between the neighboring pixels due to the influence of the noise. In addition, the correction amount may steeply change at the boundary between the saturated region and non-saturated region.

Thus, the correction amounts $E_R'$ and $E_B'$ are likely to be uneven. If the correction amounts $E_R'$ and $E_B'$ are used to remove the color fringing as they are, the color fringing reduced pixels become uneven. Thus, the smoother 152 is necessary to lower this unevenness.

Figure 3:
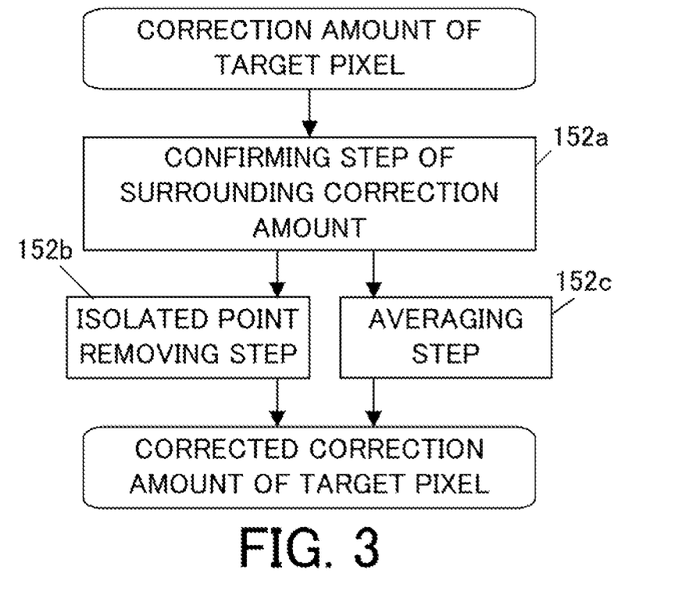
FIG. 3 is a flowchart illustrating an operation of a corrector illustrated in FIG. 1 according to the first embodiment.

The smoother 152 performs, as illustrated in FIG. 3, a surrounding correction amount confirming step 152a, an isolated point removing step 152b, and an averaging step 152c.

A description will now be given of smoothing of the R component by way of example. The surrounding correction amount confirming step 152a obtains a correction amount $E_R'(, y)$ of a certain target pixel (x, y) and the correction amounts $E_R'(x', y')$ of the surrounding pixels, such as a 3×3 pixel area (x'=x−1, x, x+1, y'=y−1, y, y+1) around the target pixel (x, y). The surrounding area is not limited to the 3×3 pixel area, and a proper surrounding area may be determined depending upon the number of pixels, the pixel size, etc.

Next, the smoother 152 determines whether or not only one pixel has a correction amount that is not 0 among the correction amount $E_R'(x, y)$ of the target pixel (x, y) and the correction amounts $E_R'(x', y')$ of the surrounding pixels. The smoother 152 proceeds to the isolated point removing step 152b if only one pixel has it, and to the averaging step 152c otherwise (if the plurality of pixels have the correction amounts that are not 0).

Figure 4A:
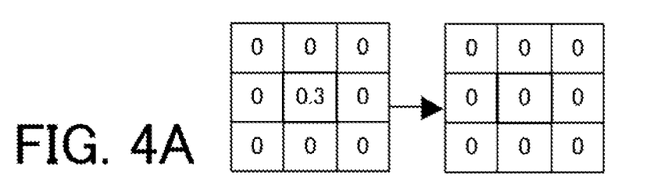
FIG. 4A is a view of an example of an isolated point removal for a correction amount according to the first embodiment.

The isolated point removing step 152b is performed when only the target pixel (x, y) has the correction amount when only one pixel has a correction amount that is not 0 among the correction amounts of the target pixel and the surrounding pixels. In this case, the calculation of the correction amount for the target pixel is determined erroneous, and the correction amount $E_R'(x, y)$ is replaced as follows (FIG. 4A):

$$E_R'(x,y) = 0 \quad (11)$$

When only the surrounding pixel has the correction amount, the correction amount $E_R'(x, y)$ is not changed. This method can eliminate an isolated corrected pixel and reduce noises, when the target pixel has the correction amount and the surrounding pixels have no correction amounts.

While this embodiment assumes that it is an error that only the target pixel has the correction amount value, this is not always the case, for example, when the surrounding area is widened. For instance, when a 5×5 area is confirmed, it may be determined erroneous that only central 2 or 3 pixels have correction amounts. The size of an isolated point may be changed to a proper value according to the size around the target pixel.

Figure 4B:
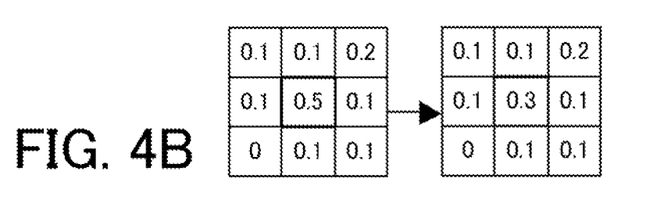
FIG. 4B is a view of illustrative smoothing for a correction amount according to the first embodiment.

In the averaging step 152c, the smoother 152 averages the correction amount $E_R'(x, y)$ of the target pixel (x, y) using the correction amounts $E_R'(x', y')$ of the surrounding area. The averaging method may use the weighted average using surrounding correction values, for example. For the 3×3 area, the correction value $E_R'(x, y)$ is averaged as follows, where W is a weighting factor. See FIG. 4B.

$$E_R'(x, y) = \frac{w_1 E_R'(x-1, y-1) + \ldots + w_5 E_R'(x, y) + \ldots + w_9 E_R'(x+1, y+1)}{w_1 + \ldots + w_9} \quad (12)$$

An edge of the correction amount is stored while the correction amounts are smoothed by the weighted average to the correction amount. For example, even when only the correction amount of the target pixel (x, y) is 0 and the surrounding pixels have correction amounts, the target pixel comes to have a correction amount, the correction amounts never scatter, and the noise in the output color image can be reduced.

The weighting factor W in the weighted average is determined as a result of a trade-off between the noise and the reducing effect. In a simple average (when all of W are 1), the correction amount becomes smooth and the reduced noises decrease. However, the correction amount of a pixel that requires a large correction amount reduces and the mitigating effect decreases. On the other hand, when the weighting factor W of the target pixel is made too high, the noise remains. For the 3×3 area, the weighting factor W of the target pixel (x, y) of about 8 and the weighting factor W of a pixel other than the target pixel (x, y) of 1 are proper.

The isolated point removing step 152b and the averaging step 152c set the smoothed correction amount $E_R'(x, y)$ to the final correction amount $E_R'(x, y)$ of the target pixel (x, y). Similarly, the smoothing processing is performed for the B component, and the smoothed correction amount $E_B'(x, y)$ is obtained.

The reducer 153 subtracts each of the correction amounts $E_R'$ and $E_B'$ smoothed by the smoother 152 from a corresponding one of the intensities of the R and B components, and obtains intensities of new R and B components as follows:

$$R = R - E_R' \quad (13)$$

$$B = B - E_B' \quad (14)$$

Thus, the color image in which the R and B components are corrected is passed to the vision correction unit 160 as the output of this color fringing reducing unit.

This embodiment discusses the image pickup apparatus that includes the imaging optical system 110 to the recoding unit 180, but part or all of the components except the color fringing reducing unit 150 may be provided as separate devices, and the present invention may be configured as an image processing apparatus configured to reduce the color fringing. In this case, the image processing apparatus may be configured to read (input) a color image taken by an image pickup apparatus different from the present invention and stored in a recording medium, such as a semiconductor recording unit, and a magnetic/optical disk.

This embodiment performs corrective processing that reduces scatters of calculated correction amounts and can suppress color fringing without damaging the sharpness of an input image. This embodiment can also reduce noises, and obtain a smooth and natural image in which the color fringing has been reduced.

Second Embodiment

Figure 5:
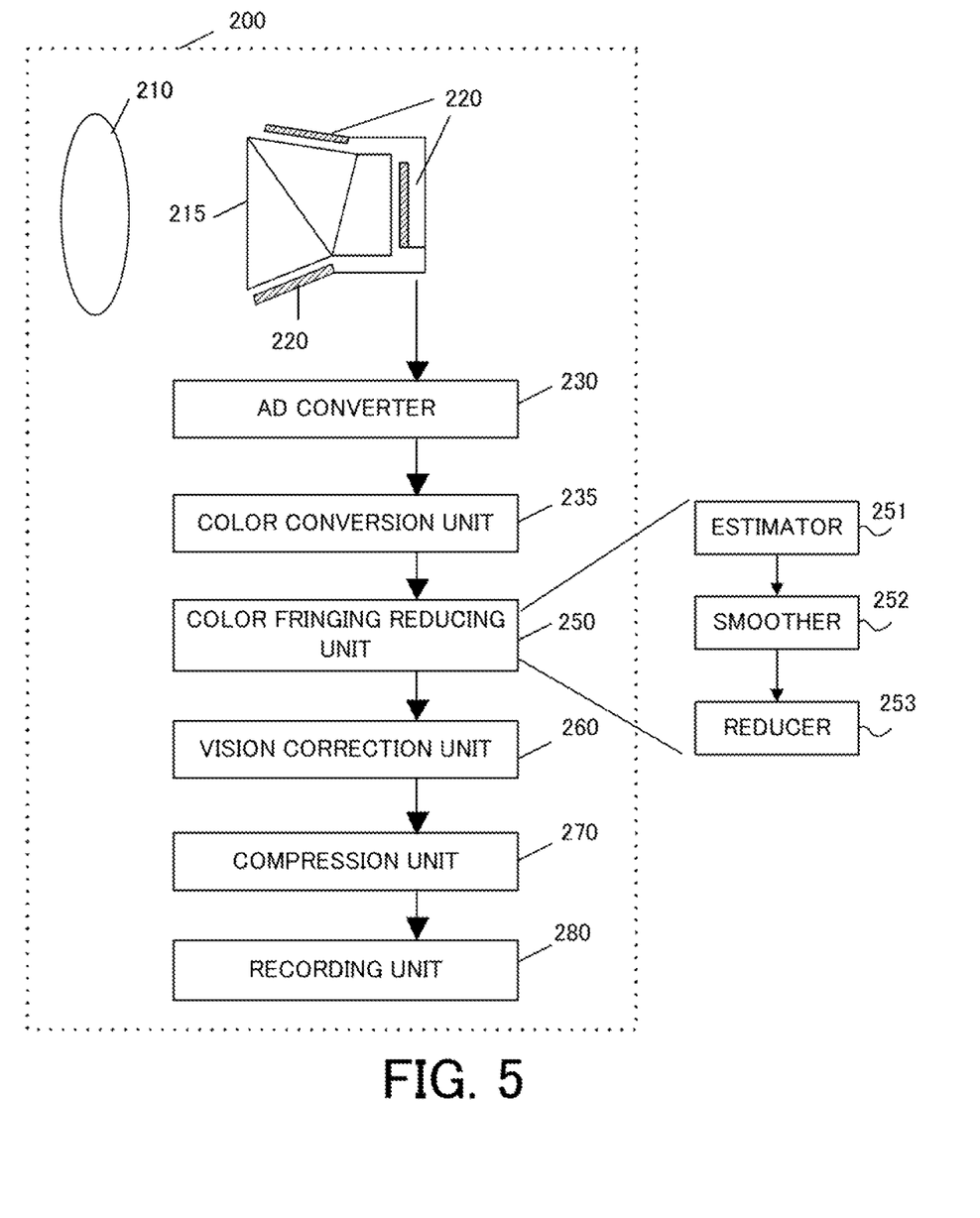
FIG. 5 is a block diagram of an image pickup apparatus according to a second embodiment of the present invention.

FIG. 5 is block diagram of an image pickup apparatus 200 that includes an image processing apparatus configured to reduce color fringing in a color image according to a second embodiment. The image pickup apparatus 200 includes an imaging optical system 210, a color separating prism 215, an image sensor 220, an AD converter 230, a color conversion unit 235, a color fringing removing unit 250, a vision correction unit 260, a compression unit 270, and a recording unit 280.

The image sensor 220 is a three-plate type different from that of the first embodiment. Accordingly, the color separating prism 215 is added, and the demosaicking unit 140 of the first embodiment becomes unnecessary.

In FIG. 5, a ray from an object forms an image on the image sensor 220 through the imaging optical system 210 and the color separating prism 215. The light reaches image sensors 220 different according to the RGB wavelength bands since the traveling direction of the ray is different in the color separating prism depending upon the wavelength of the light. Thus, the image sensor 220 includes no color filter, and an image corresponding to each of the RGB color components is acquired.

The chromatic aberration of the imaging optical system 210 of this embodiment is well corrected in the R and G wavelength bands, and the chromatic aberration remains in the B wavelength band. The chromatic aberration is correctible in the three-plate type image sensors by adjusting a position of each image sensor in the optical axis direction, but this configuration is not resistant to fluctuations of the aberrational amount caused by a zoom position of the optical system. Thus, this embodiment does not consider such an adjustment, and the resolution of B component is inferior to the resolutions of the RG components. In a color image that synthesizes these three components with one another, as illustrated in FIG. 6 of JP 2008-147980, blue blurs in the boundary between the bright region and the dark region, and an artifact like blue edging occurs around the bright region.

The AD converter 230 converts an image of each of the RGB color components output from the three image sensors as an analog voltage into digital data suitable for the following image processing.

The color fringing reducing unit 250 constitutes an image processing apparatus configured to reduce this artifact in the color image by the image processing, as described later. The vision correction unit 260, the compression unit 270, and the recording unit 280 are similar to the vision correction unit 160, the compression unit 170, and the recording unit 180 of the first embodiment.

A description will now be given of the image processing by the color fringing reducing unit 250. The color fringing reducing unit 250 includes an estimator 251, a smoother 252, and a reducer 253, processes an input image in this order, and outputs an output image.

Figure 6A:
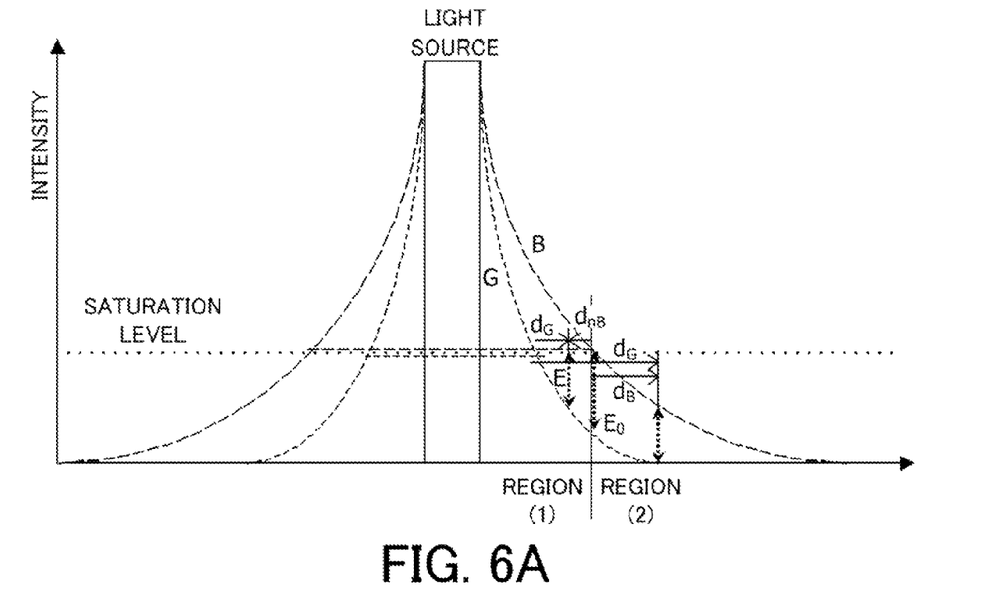
FIG. 6A is a view of typical profiles of B and G planes for a highly bright object according to the second embodiment.

FIG. 6A shows typical profiles of the B and G components for a highly bright object. An abscissa axis denotes a section in the image and an ordinate axis denotes intensities of the B and G components.

As described in JP 2008-147980, the captured image has regions in which the G and B components are saturated, and which are a little larger than the original, highly bright object. Thus, a white saturated area is formed. Assume that the R component and the G component have equal profiles. Then, the G component attenuates, but the saturation radius of the B component is wider. As a result, an image intensity difference gradually increases between the G and B components, and bluish grows as light blue. However, when the saturation radius of the B component is reached, the B component also starts attenuating. Then the image intensity difference between the G component and the B component reduces. At the end of the skirt of the G component at a certain position, only the B component has the intensity and very blue fringing occurs.

Bluishness in the light blue region and very blue fringing are unnatural. If fringing of the B component is approximately level with that of the G component, the fringing is recognized as the natural color of the highly bright object.

Accordingly, the estimator 251 estimates a color fringing amount utilizing a distance from the saturated pixel. In this case, the estimator 251 performs a distance calculating step, a region determining step, a color fringing amount estimating step, and an excessive removal preventing step.

Figure 6B:
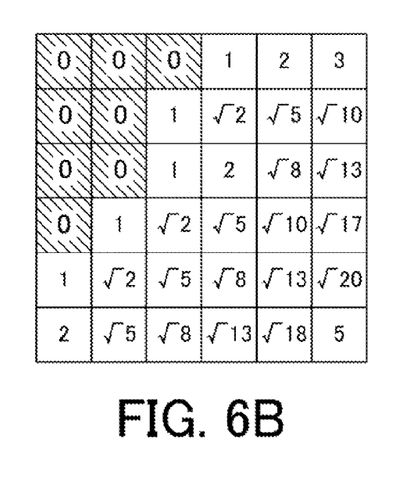
FIG. 6B is a view illustrating a distance from a saturated pixel to each surrounding pixel.

In the distance calculating step, the estimator 251 first extracts the saturated pixels having intensities higher than a constant threshold for each of the G and B color components, and calculates distances $d_G$ and $d_B$ from the region by a pixel width unit for each pixel. For example, when it is assumed that a beveled portion in FIG. 6B is the saturated pixels in which electric charges are saturated in the image sensor 220, the distances are expressed by numerical values as in the pixels.

Assume that the threshold is an output value outside the linear relationship between an output value of the AD converter and the incident light intensity. A state having a higher output value will be referred to as "saturation." In general, the calculation of the distance is called an image distance conversion. This distance is not limited to an accurate Euclidean distance, and may be substituted by a quansi-Euclidean distance, a chessboard distance, and a city block distance. The saturated pixel becomes 0 and the non-saturated pixel has a positive value when this image distance conversion is used.

Figure 6C:
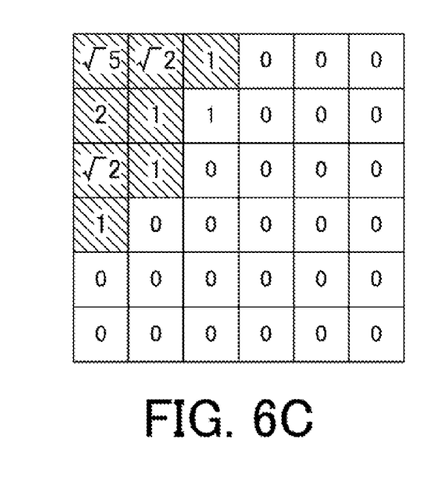
FIG. 6C is a view illustrating a distance from each surrounding pixel to the saturated pixel.

Due to this code, each pixel is classified into a region (1) in which the B component is saturated and a region (2) in which the B component is not saturated (as illustrated in FIG. 6A), and a distance $d_{nB}$ is similarly calculated at least for the region (1) from the region in which the B component is not saturated. When FIG. 6B is $d_B$, $d_{nB}$ becomes as illustrated in FIG. 6C. "$d_{nB}$" can be expressed as a negative value in $d_B$.

In the region determining step, the estimator 251 distributes processing to a plurality of processing methods in the color fringing amount estimating step according to the extraction result.

The color fringing amount estimating step estimates the intensity of the extra B component that causes the color fringing for each pixel in the color image. The estimating method differs according to whether the B component is saturated, and corresponds to regions (1) and (2) in FIG. 6A, respectively.

As described above, the image intensity of the B component to be reduced is a difference between the B and G components. An estimated amount increases in the region (1) as a distance increases from the saturated area of the G component, and the estimated amount decreases in the region (2) as a distance increases from the region (1).

This cannot be directly obtained because of the saturation although this estimated amount depends upon the brightness of the highly bright object. Accordingly, this embodiment substitutes a difference $d_G-d_B$ of the B and G saturation radii or $d_G+d_{nB}$ for it. An estimated fringing amount $E_B$ is calculated as this estimated amount for the region (1) as follows:

$$E_B = (k_1(d_G + d_{nB}) + k_0) \times \frac{d_G}{d_G + d_{nB}} \tag{15}$$

On the other hand, the estimated fringing amount $E_B$ is calculated for the region (2) as follows:

$$E_B = (k_1(d_G - d_{nB}) + k_0)\exp(-k_2 d_B) \tag{16}$$

Then, the excessive removal preventing step follows. At this time, no Mach band occurs since they are equal to EB0= (k1dG+k0) on the boundary between the regions (1) and (2).

It is desirable to find a suitable value so as to approximate the color fringing amount from the captured image since $k_0$, $k_1$, and $k_2$ are constants and different from one another depending upon the imaging optical system and a pixel pitch in the image sensor. Strictly speaking, since the characteristic of the imaging optical system varies according to a zoom position, a diaphragm value, a focus position, a lens exchange state, and an image height, it is also effective to vary the constants $k_0$, $k_1$, and $k_2$ according to these factors. Alternatively, a constant used to estimate an excessive color fringing amount may be set so as to follow the characteristic variation of the imaging optical system in consideration of the excessive removal preventing step. As a result, it is proper to set the constant used to estimate the excessive color fringing amount utilizing a value that is suitable for an approximation of the color fringing amount.

In the excessive removal preventing step, the estimator 251 corrects the estimated amount $E_B$, and determines an amount $E_B'$ to be actually removed. The correction amount $E_B$ accords with a certain model, and does not necessarily accord with the actual fringing amount.

For example, a way of fringing is different between a light flux having a wavelength of 450 nm and a light flux having a wavelength of 400 nm even if they are detected as the B component. However, the color fringing amount estimating step 251c does not consider this difference. When the correction amount $E_B$ is too low, bluishness slightly remains after the reducing step. On the other hand, when the correction amount $E_B$ is too high, the B component is excessively reduced to a gray background and the color becomes pea green. In particular, the latter is so unnatural that it gives an observer a big sense of discomfort.

Accordingly, this step limits a fringing reducing range to a certain hue range. Hence, the chromaticity of the pixel is first calculated. The following expressions are set for each of the RGB components:

$$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix} \tag{17}$$

$$a = 5(x-y)$$

$$b = 2(y-z)$$

Figure 7:
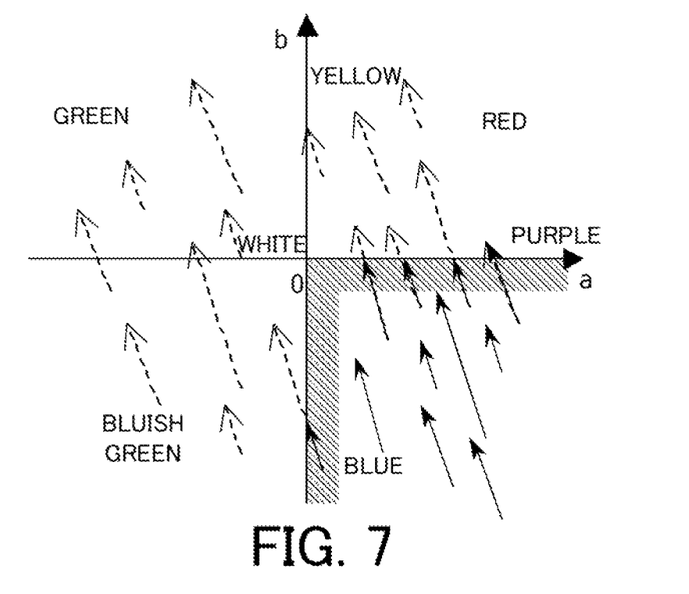
FIG. 7 is a chromaticity coordinate according to the second embodiment.

When this chromaticity coordinate ab plane is illustrated in FIG. 7, blue is located on the fourth quadrant. When the estimated amount $E_B$ is removed from the B component, it moves to the upper left direction as illustrated by a dotted arrow. A start point of the arrow indicates the chromaticity before the reducing step and the tip indicates the chromaticity after the reducing step by the estimated amount $E_B$. The following expression is made by limiting the affecting hue range to a'>0 and b'<0:

$$B > 0.22R + 0.68G \text{ and } B > -1.84R + 3.30G \tag{18}$$

Therefore, the excessive removal preventing step initially sets $E_B' = 0$ for a pixel that does not satisfy the above condition, and removes that pixel from the object to be reduced. Thereby, this pixel does not change by the reducer 253, and a pixel value is not influenced by this color fringing reducing unit. That is, only the pixel that satisfies the condition becomes the object to be reduced.

Moreover, the correction amount is calculated for the pixel that satisfies the condition as follows:

$$E_B' = \min(E_B, B-(0.22R+0.68G), B-(-1.84R+3.30G)) \tag{19}$$

As illustrated in FIG. 7 by a solid line arrow, the chromaticity variation caused by the correction of $E_B'$ stays in the fourth quadrant. The chromaticity coordinate ab (simple La*b* color space) may be replaced with YUV or HSV space and then restricted.

The smoother 252 smoothes the correction amounts $E_B'$ obtained by the estimator 251. According to the color fringing estimating method using a distance from the saturated pixel, the obtained correction amount $E_B$ is smooth but the correction amounts $E_B'$ become uneven after the excessive removal preventing step. The corrector 252 smoothes the correction amounts $E_B'$ in order to ease this unevenness and to suppress the generation of the noise. Smoothing may be may be performed by preparing a filter F and by performing a convolution for the correction amounts $E_B'$ for all pixels as follows:

$$E = E_B' \otimes F \tag{20}$$

The filter may use a smoothing filter, or another noise filter, such as a median filter configured to preserve an edge of the correction amount.

The reducer 253 subtracts the correction amount E from the intensity of the B component, sets a new B component intensity by the next expression, and passes the color image in which the B component is corrected, to the vision correction unit 260 as an output of this color fringing reducing unit 250.

$$B = B - E_B \tag{21}$$

This embodiment can provide a natural captured image in which bluishness is effectively reduced, without causing a sense of discomfort.

Third Embodiment

Figure 8:
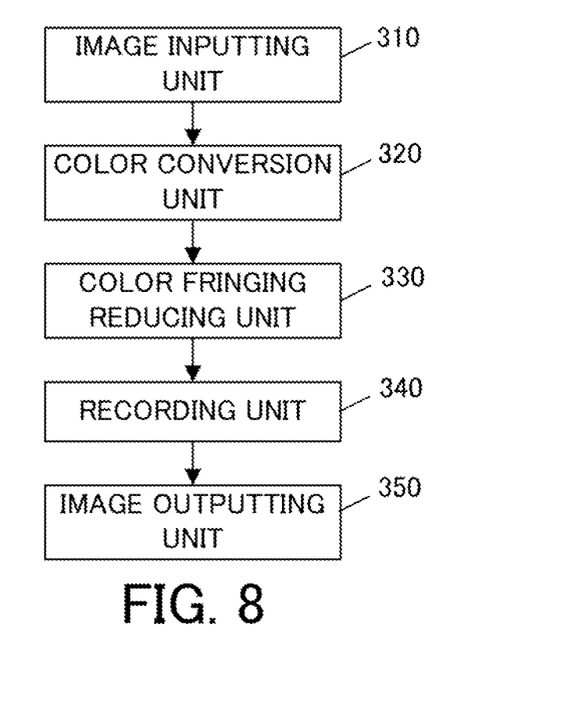
FIG. 8 is a block diagram of an image pickup apparatus according to a third embodiment of the present invention.

FIG. 8 is block diagram of an image processing apparatus 300 configured to reduce color fringing in a color image according to a third embodiment. The image processing apparatus 300 of this embodiment is provided outside of the image pickup apparatus, such as in a personal computer (PC), and includes an image inputting unit 310, a color conversion unit 320, a color fringing reducing unit 330, a recording unit 340, and an image outputting unit 350.

The image inputting unit 310 receives a color image taken by an image pickup apparatus, and an arbitrary color image, such as a color image read by a color image reader. The color conversion unit 320 converts a color image input with a variety of forms into a chromatic form used for the color fringing reducing unit 330.

The color fringing reducing unit 330 performs a spatial operation, extracts a color fringing region, estimates a color fringing amount, and reduces the estimated amount from the input color image through a subtraction or other processing.

The recording unit 340 records in a recording medium, such as an HDD, and an external recording medium, such as a flash recording unit, a color image in which color fringing is reduced by the fringing removing unit 330. The image outputting unit 350 outputs the color image in which the color fringing is reduced by the color fringing reducing unit 330, to a display, etc.

Figure 9A:
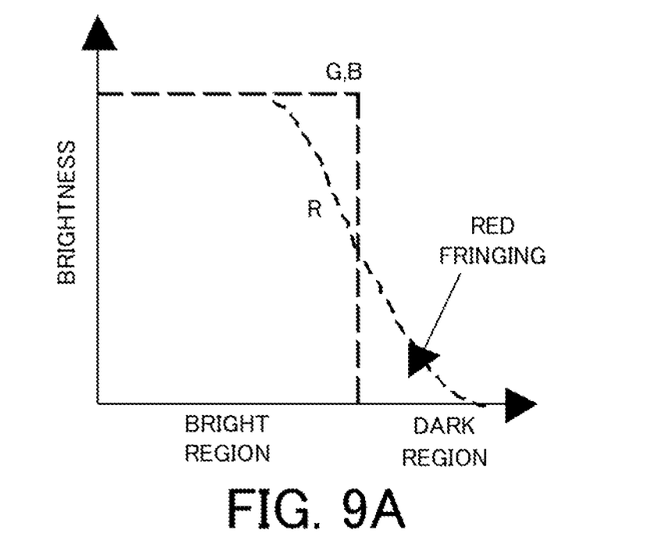
FIG. 9A is a view illustrating red fringing in a boundary between a bright region and a dark region according to the third embodiment.

The color fringing reducing unit 330 includes the estimator, the smoother, and the reducer. In an example, assume that the color fringing reducing unit 330 reduces the R component utilizing the G component as a reference component. As illustrated in FIG. 9A, the color fringing occurs around an edge having a large brightness difference. The edge would be white or black without color fringing but may be cyanic or red since the R component becomes dull, and color fringing may occur before and after the edge.

The estimator estimates a color fringing region by detecting an edge, and the reducer may use a method that utilizing a gamma correction for reductions.

The estimator detects the edge by differentiating the G component as the reference component in the input color image. An edge detecting method, such as a differentiating method, may use an arbitrary method and is not limited. Next, tints of pixels around the detected edge in the input color image are confirmed, and reddish pixels are detected.

The correction amount is estimated by a variety of values, such as the image intensity of the detected color fringing pixel, an image intensity difference from the edge, and an image height. The correction amounts herein are coefficients $E_R$ and $\gamma$ for the gamma correction because the reducer utilizes the gamma correction as follows:

$$R_{out} = E_R R_{in}^{\gamma} \tag{22}$$

Figure 9B:
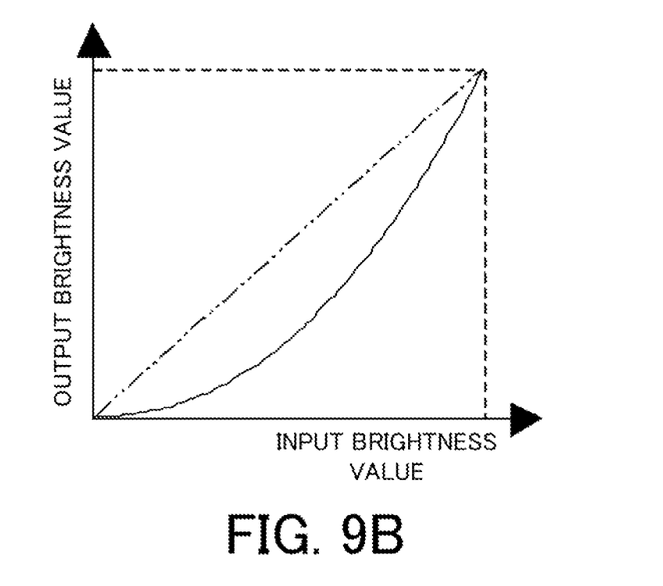
FIG. 9B is a view illustrating a gamma correction.

The correction amounts ER and $\gamma$ are values that serve to drop the value of the R component in the red fringing region illustrated in FIG. 9A, for example, like a relationship illustrated in FIG. 9B.

The smoother smoothes the correction amount estimated by the estimator. The correction amounts $E_R$ and $\gamma$ are estimated for each pixel by the image intensity and the image intensity difference from the edge, and thus may be uneven. The color fringing is likely to depend upon a distance from the edge, as described in the first and second embodiments. Accordingly, the smoother smoothes the correction amounts by averaging the correction amounts of the pixels equally distant from the edge.

The reducer reduces the color fringing utilizing the gamma correction and the correction amounts smoothed by the smoother, and outputs the color fringing reduced image to the recording unit 340.

This embodiment effectively reduces reddishness and can provide a natural color image without causing a sense of discomfort.

The present invention may be directed to a program configured to enable a computer to serve as the estimator, the corrector, and the reducer. The image processing apparatus of this embodiment is more effective to the first embodiment. This is because the calculation of the first embodiment is so simplified that it is likely to contain errors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129820, filed Jun. 10, 2011, which is hereby incorporated by reference herein in its entirety.

What is claimed is:

1. An image processing apparatus configured to perform processing for reducing color fringing in a color image, the image processing apparatus comprising:
   an estimator configured to estimate, for each area, a correction amount used to reduce the color fringing;
   a smoother configured to smooth a plurality of correction amounts for a plurality of areas, estimated by the estimator; and
   a reducer configured to reduce the color fringing utilizing the correction amounts smoothed by the smoother.

2. The image processing apparatus according to claim 1, wherein the estimator estimates the correction amount of the color fringing utilizing a slope of a signal intensity among neighboring pixels for each color component.

3. An image processing method configured to perform processing for reducing color fringing in a color image, the image processing method comprising the steps of:

estimating, by an estimator, for each area, a correction amount used to reduce the color fringing;

smoothing, by a smoother, a plurality of correction amounts for a plurality of areas, estimated by the estimating step; and reducing, by a reducer, the color fringing utilizing the correction amounts smoothed by the smoothing step.

4. A non-transitory computer-readable storage medium storing a program for enabling a computer to serve as:

an estimator configured to estimate, for each area, a correction amount used to reduce the color fringing;

a smoother configured to smooth a plurality of correction amounts for a plurality of areas, estimated by the estimator; and a reducer configured to reduce the color fringing utilizing the correction amounts smoothed by the smoother.

5. An image pickup apparatus comprising an image processing apparatus configured to perform processing for reducing color fringing in a color image, wherein the image processing apparatus includes:

an estimator configured to estimate, for each area, a correction amount used to reduce the color fringing;

a smoother configured to smooth a plurality of correction amounts for a plurality of areas estimated by the estimator; and a reducer configured to reduce the color fringing utilizing the correction amounts smoothed by the smoother.

* * * * *